(48.)
CHARLIE H. MARTIN.
Fruit Drier.
No. 121,795.
Patented Dec. 12, 1871.
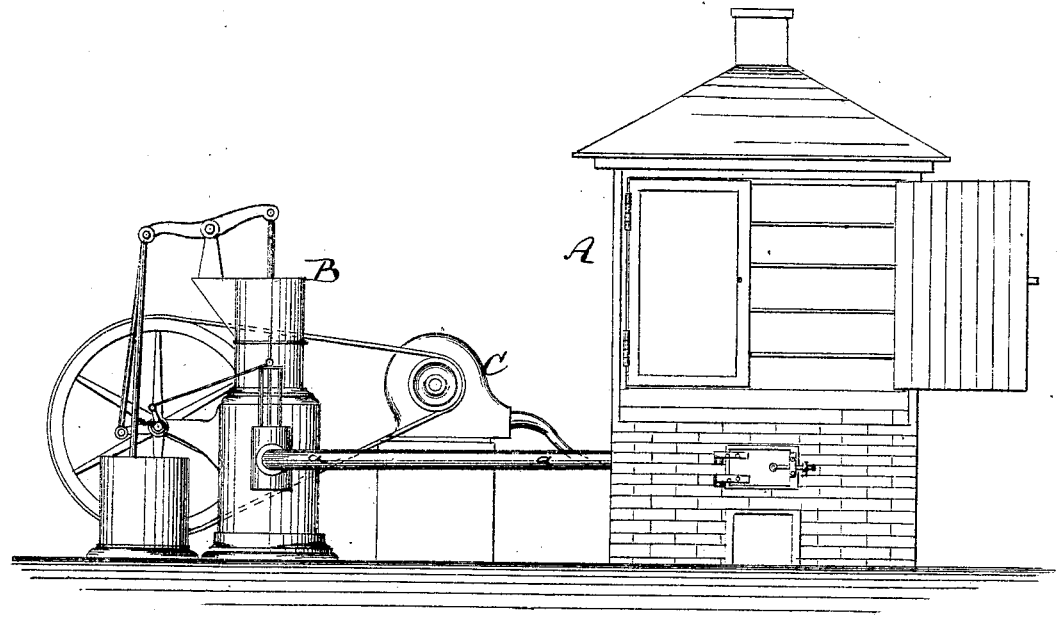
Witnesses:
Chas Nida.
Alex T. Roberts
Inventor.
Chas. H. Martin
Per Munn & Co
Attorneys.

UNITED STATES PATENT OFFICE.

CHARLIE H. MARTIN, OF CHAPINVILLE, NEW YORK.

IMPROVEMENT IN FRUIT-DRIERS.

Specification forming part of Letters Patent No. 121,795, dated December 12, 1871.

*To all whom it may concern:*

Be it known that I, CHARLIE H. MARTIN, of Chapinville, in the county of Ontario and State of New York, have invented a new and useful Improvement in Fruit-Driers; and do hereby declare that the following is a full, clear, and exact description thereof, which will enable others skilled in the art to make and use the same, reference being had to the accompanying drawing forming part of this specification.

The drawing represents a side view of my invention.

The object of this invention is to obtain air for the evaporation of water from fruits, berries, milk, juices, and solutions, of as pure a quality as possible, so that the mass or solution may not be contaminated by impure matter carried to it by heated air. My invention consists in combining a caloric-engine with a fruit-drier or evaporator in such manner that the engine will exhaust into the drier or evaporator, and thereby furnish the mass or solution with a supply of pure air.

A in the drawing represents a fruit-drier or evaporator of suitable construction. B is a caloric-engine of suitable kind. The exhaust-pipe $a$ of the engine leads into the lower part of the fruit-drier or evaporator, and supplies the latter with the requisite quantity of hot air. The temperature may be lowered by causing a stream of cold air, driven by a pump or fan, C, that is operated by the engine B, to mix with the exhaust from the engine.

Having thus described my invention, I claim as new and desire to secure by Letters Patent—

The combination of a caloric-engine with a fruit-drier or evaporator in such manner that the former will exhaust into the latter, as specified.

CHARLIE H. MARTIN.

Witnesses:
    THOS. B. CHAPIN,
    E. H. FRARY. (48)